(12) United States Patent
Werbner (10) Patent No.: US 9,382,106 B2
(45) Date of Patent: Jul. 5, 2016

(54) LIQUID HANDLING SYSTEM WITH REDUCED EXPOSURE TO AIR

(71) Applicant: Norman Werbner Information Services, Inc., Long Key, FL (US)

(72) Inventor: Norman Werbner, Long Key, FL (US)

(73) Assignee: Norman Werbner Information Services, Inc., Long Key, FL (US)

( * ) Notice: Subject to any disclaimer, the term of this patent is extended or adjusted under 35 U.S.C. 154(b) by 153 days.

(21) Appl. No.: 13/946,171

(22) Filed: Jul. 19, 2013

(65) Prior Publication Data

US 2015/0021361 A1    Jan. 22, 2015

(51) Int. Cl.
| | |
|---|---|
| *B65D 88/34* | (2006.01) |
| *B67D 1/04* | (2006.01) |
| *B67D 1/08* | (2006.01) |
| *C12H 1/16* | (2006.01) |
| *C12H 1/22* | (2006.01) |
| *B67D 3/00* | (2006.01) |

(52) U.S. Cl.
CPC ............ *B67D 1/0431* (2013.01); *B67D 1/0885* (2013.01); *B67D 3/0038* (2013.01); *C12H 1/16* (2013.01); *C12H 1/22* (2013.01)

(58) Field of Classification Search
CPC ...... B65D 81/245; B65D 47/32; B65D 51/16; B65D 81/263; B67D 1/0009; B67D 3/0038; B67D 1/045; B67D 1/0431; B67D 1/0885
USPC .................................................. 220/216, 227
See application file for complete search history.

(56) References Cited

U.S. PATENT DOCUMENTS

| | | | | |
|---|---|---|---|---|
| 222,988 | A * | 12/1879 | Fairlamb | A01J 9/00 220/212.5 |
| 280,820 | A * | 7/1883 | Hickson | A01J 9/00 220/216 |
| RE10,643 | E * | 9/1885 | Elder | 220/216 |
| 1,267,434 | A * | 5/1918 | MacPherson | B65D 88/34 220/216 |
| 1,611,440 | A * | 12/1926 | Haupt | B65D 88/34 220/216 |
| 1,950,137 | A | 3/1934 | Dowe | |
| 2,050,686 | A * | 8/1936 | Wiggins | F17B 1/08 220/216 |
| 2,393,217 | A | 1/1946 | Brewton | |
| 2,515,956 | A | 7/1950 | Greenberg | |
| 3,419,174 | A * | 12/1968 | Engdahl | F17C 3/022 220/216 |
| 3,862,701 | A * | 1/1975 | Strunc | B65D 88/34 137/587 |
| 3,902,491 | A | 9/1975 | Lajus | |
| 3,987,941 | A | 10/1976 | Blessing | |
| 4,120,425 | A | 10/1978 | Bethurum | |

(Continued)

FOREIGN PATENT DOCUMENTS

CN        201849722        6/2011

OTHER PUBLICATIONS

Analytical Columns . . . Chromatography Specialists from the following webpage: http://www.analyticalcolumns.com/syringes/sge/sgesyringesmicrovol0.5-5.html; Printed on Jul. 19, 2013; 3 pages.

(Continued)

*Primary Examiner* — Patrick M Buechner
(74) *Attorney, Agent, or Firm* — Hovey Williams LLP (57) ABSTRACT

A liquid handling system and a method for receiving, storing, and dispensing a liquid while minimizing the exposure of the liquid to the ambient air are disclosed. The method includes upwardly shifting a barrier positioned in a storage container while filling the container with the liquid.

16 Claims, 4 Drawing Sheets

(56) References Cited

U.S. PATENT DOCUMENTS

| | | | |
|---|---|---|---|
| 4,240,570 A | 12/1980 | Brown et al. | |
| 4,392,578 A | 7/1983 | Fipp et al. | |
| 4,597,422 A | 7/1986 | Kovacevich, Jr. | |
| 4,691,842 A | 9/1987 | Foures | |
| 5,454,268 A | 10/1995 | Kim | |
| 5,770,158 A | 6/1998 | Eischen et al. | |
| 5,848,222 A * | 12/1998 | Jung | F24H 1/18 222/146.5 |
| 5,873,861 A | 2/1999 | Hitchins et al. | |
| 6,105,803 A | 8/2000 | Standish | |
| 6,170,715 B1 | 1/2001 | Evans | |
| 6,290,105 B1 | 9/2001 | Cosentino | |
| 7,051,901 B2 | 5/2006 | Hickert | |
| 7,077,273 B2 * | 7/2006 | Ellsworth | A61M 1/3693 210/514 |
| 2002/0088827 A1 | 7/2002 | Colucci | |
| 2007/0039977 A1 | 2/2007 | Donaldson | |
| 2007/0138212 A1 | 6/2007 | Greenbaum | |
| 2008/0110847 A1 | 5/2008 | Rees et al. | |
| 2009/0166281 A1 * | 7/2009 | Antonetti | B65D 81/245 210/242.1 |
| 2009/0274793 A1 | 11/2009 | Schroeder | |
| 2010/0108182 A1 | 5/2010 | Noonan | |
| 2010/0206900 A1 | 8/2010 | Dobrusskin et al. | |
| 2011/0290826 A1 | 12/2011 | Harris | |

OTHER PUBLICATIONS

Gastight Syringes from the following webpage: http://www.hamiltoncompany.com/products/syringes/c/794/; Hamilton Company; Printed on Jul. 19, 2013; 2 pages.

7000 Series Modified Microliter Syringe; Hamilton Company, Reno, Nevada; Document No. 69065(Rev. F); Jul. 2007; 3 pages.

Search Report and Written Opinion dated Jun. 16, 2015 for related PCT Application No. PCT/US2014/047240, 13 pages.

Preliminary Report on Patentability dated Jan. 28, 2016 for related PCT Application PCT/US2014/047240, 12 pages.

* cited by examiner

LIQUID HANDLING SYSTEM WITH REDUCED EXPOSURE TO AIR

FIELD OF THE INVENTION

The invention relates generally to the handling of liquids. More particularly, the invention relates to systems and methods for receiving, storing, and dispensing a liquid with minimal exposure of the liquid to ambient air, or other external environmental conditions.

BACKGROUND OF THE INVENTION

The shelf life and/or usefulness of certain liquids can deteriorate upon exposure to environmental components external to a container storing the liquid. For example, the shelf life of wine significantly decreases upon being exposed to ambient air by oxidizing chemicals in the wine, which can alter its taste and color. Other liquids that are stored in sealed containers can also be oxidized or otherwise affected by the air. Even if a liquid is protected while being extracted from a container, any subsequent handling of the extracted liquid can introduce air into the remaining liquid. Current liquid handling devices attempt to alleviate these problems in a variety of ways; however, they may be difficult to operate and do not provide an adequate solution for handling a liquid while minimizing exposure of the liquid to the ambient air. Therefore, there is a need for a liquid handling system and method that can successfully receive, store, and dispense a liquid to increase its shelf life and/or usefulness.

SUMMARY OF THE INVENTION

In one embodiment of the present invention, a system for receiving, storing, and dispensing a liquid with minimal exposure of the liquid to ambient air is provided that includes a storage container including a top, a bottom, and one or more upright sidewalls, where the top, bottom, and sidewalls cooperatively define an internal volume configured to receive and hold the liquid; a shiftable barrier positioned in the internal volume and dividing the internal volume into a lower portion and an upper portion, where the barrier is shiftable between a lowermost position and an uppermost position, where the barrier is sized to fill at least 90 percent of the horizontal cross-sectional area of the internal volume defined by the upright sidewalls; a liquid inlet disposed below at least a portion of the barrier when the barrier is in the lowermost position; and a vent configured to permit gas to flow through and/or around the barrier from the lower portion of the internal volume to the upper portion of the internal volume.

In another embodiment of the present invention, a liquid handling method that minimizes exposure of the handled liquid to ambient air is provided that includes the steps of (a) filling at least a portion of a storage container with a liquid via a liquid inlet of the storage container; and (b) during the filling of step (a), upwardly shifting a barrier positioned in the storage container from a lowermost position to an uppermost position, where during the upwardly shifting the barrier maintains contact with at least 90 percent of the upper surface of the liquid in the storage container, where the liquid inlet is disposed below at least a portion of the barrier when the barrier is in the lowermost position.

BRIEF DESCRIPTION OF THE FIGURES

Embodiments of the present invention are described herein with reference to the following drawing figures, wherein.

DETAILED DESCRIPTION

The following detailed description of the invention references various embodiments. The embodiments are intended to describe aspects of the invention in sufficient detail to enable those skilled in the art to practice the invention. Other embodiments can be utilized and changes can be made without departing from the scope of the present invention. Further, it should be understood that the below described embodiments are not exclusive of one another, and any portion of the description, properties, and parameters of any one embodiment can be combined with any portion of the description, properties, and parameters of any other embodiment. The following detailed description is, therefore, not to be taken in a limiting sense. The scope of the present invention is defined only by the appended claims, along with the full scope of equivalents to which such claims are entitled.

Figure 1:
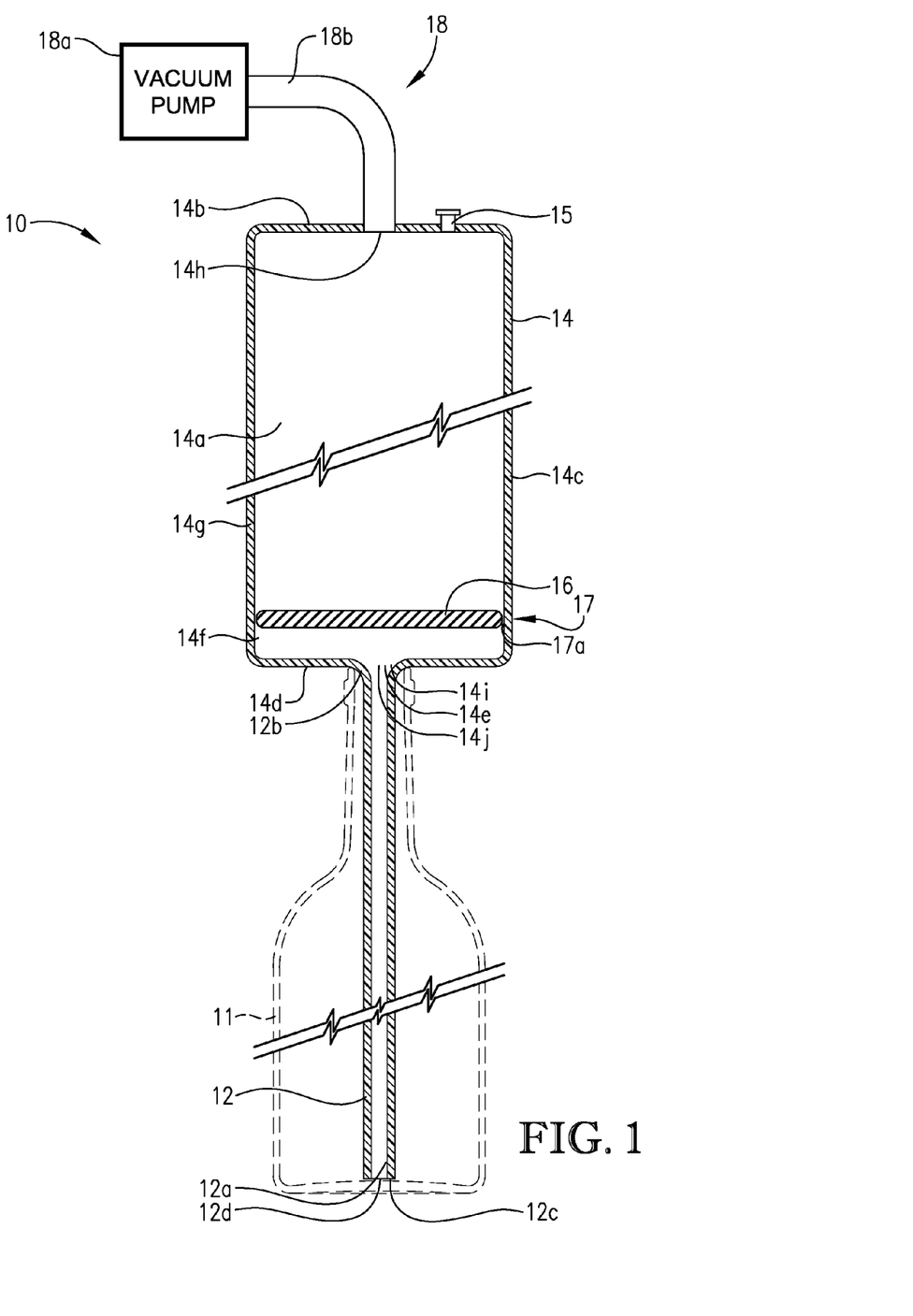
FIG. 1 is a cross-sectional and side view of a liquid handling system in accordance with one embodiment of the present invention, particularly illustrating a liquid extraction member received inside a container, a shiftable barrier received inside a storage container located above the extraction member, and a vacuum pump coupled to the top of the storage container.

FIG. 1 depicts one embodiment of a liquid handling system 10 in accordance with the present invention. It should be understood that FIG. 1 depicts just one embodiment of a liquid handling system, and that a wide variety of embodiments of liquid handling systems are contemplated by the present invention. The liquid handling system 10 of FIG. 1 will now be described in detail.

The liquid handling system 10 can receive, dispense, and/or store a variety of liquids. In certain embodiments, the liquid can be any liquid where it is desirable to minimize contact with the ambient air and/or other external environmental components. In various embodiments, the liquid can be a non-consumable liquid, such as, for example, industrial chemicals, or household chemicals. In one or more embodiments, the liquid can be a consumable liquid such as, for example, wine, juice, milk, or a medicament. In a preferred embodiment, the liquid can be wine.

The liquid can be housed in any type of container 11. In certain embodiments, the container 11 can be configured to seal closed so that a liquid received therein is not in contact with the ambient air and/or other external environmental components. In certain embodiments, the container 11 can be a drum, can, bottle, or an aseptic packaging article. In one or more embodiments, the container 11 can be a standard size wine bottle. In the embodiment depicted in FIG. 1, the container 11 is a wine bottle.

The liquid handling system 10 of FIG. 1 includes a storage container 14, an elongated liquid extraction member 12, a shiftable barrier 16, and a differential pressure creation device 18. The storage container 14 can be made from any material and a specific material can be chosen by one skilled in the art for a particular purpose. In certain embodiments, the storage container 14 can be made of a material that is suitable for contacting a specific liquid stored in the container 11, such as, for example, stainless steel, glass, or a plastic material. In one or more embodiments, the storage container 14 can be coated in a substance that is suitable for contacting a specific liquid stored in the container 11.

The storage container 14 can be any size and shape, and a particular size and shape can be chosen by one skilled in the art. In the embodiment depicted in FIG. 1, the storage container 14 defines an internal volume 14a. In one or more embodiments, the internal volume 14a can be at least 0.1 liters, 0.25 liters, or 0.4 liters, and/or not more than 4 liters, 3 liters, or 2 liters. In various embodiments, the maximum internal diameter of the storage container 14 is at least 1.5 times, 2 times, 4 times, 8 times, or 10 times greater than the maximum internal diameter of the liquid extraction member 12. In certain embodiments, the storage vessel 14 has a cylindrical shape. It should be understood that the maximum internal diameter refers to a straight line extending from one point on the interior surface of the extraction member 12, and/or the storage container 14, to another point on the interior surface of the extraction member 12, and/or the storage container 14, passing through the center of the extraction member 12, and/or or the storage container 14, and does not necessarily require the extraction member 12, and/or the storage container 14, to have a circular or cylindrical shape. In certain embodiments, the maximum external diameter of the storage container 14 can be at least 1.5 times, 2 times, 4 times, 8 times, or 10 times greater than the maximum external diameter of the liquid extraction member 12. It should be understood that referencing the maximum external diameter of the extraction member 12 and the storage container 14 does not require such components to have a circular or cylindrical shape, but rather, refers to a straight line extending from one point on the external surface of the component to another point on the external surface, passing through the center of that component.

The storage container 14 of FIG. 1 includes a top 14b, a bottom 14d, and an upright sidewall 14c. In one or more embodiments, the storage container 14 can include one or more upright sidewalls 14c. In the embodiment depicted in FIG. 1, the top 14b, bottom 14d, and the upright sidewall 14c are made of one article and are integrally connected. In one or more embodiments, the storage container 14 includes a detachable top 14b. In certain embodiments, the top 14b is detachable from the upright sidewall 14c. The top 14b can be removably attached to the upright sidewall 14c in any manner, and a specific attachment mechanism can be chosen by one skilled in the art. In certain embodiments, the top 14b can be removably attached to the upright sidewall 14c by complimentary threaded portions on the top 14b and the upright sidewall 14c. In one or more embodiments, the top 14b can include a flexible material extending around the perimeter of the top 14b so as to releasably attach to a complimentary shaped portion of the upright sidewall 14c, and to provide an airtight seal.

In certain embodiments, the liquid handling system 10 includes an elongated liquid extraction member 12. In one or more embodiments, the liquid extraction member 12 is coupled in fluid flow communication with the liquid inlet 14e of the storage container 14. As shown in the embodiment depicted in FIG. 1, the interior chamber 12a of the extraction member 12 is aligned with the liquid inlet 14e of the storage container 14, thereby allowing fluid flow communication between the extraction member 12 and the liquid inlet 14e of the storage container 14. In certain embodiments, the extraction member 12 can be fixedly coupled to the storage container 14. For example, in the embodiment depicted in FIG. 1, the storage container 14 and the extraction member 12 of FIG. 1 are made of one unitary article. In certain embodiments, the extraction member 12 and the storage container 14 can be fixedly coupled in any manner, and a specific coupling mechanism can be chosen by one skilled in the art.

In one or more embodiments, the extraction member 12 may be removably coupled to the storage container 14. For example, in certain embodiments, the extraction member 12 can be coupled to the storage container 14 by complimentary threaded portions in the bottom 14d of the storage container 14 and in the top end 12b of the extraction member 12. In one or more embodiments, the extraction member 12 can be removably coupled to the storage container 14 in a variety of ways and any particular method can be chosen by one skilled in the art. In certain embodiments, after the liquid handling system 10 is used to extract liquid from the container 11, all or a portion of the extraction member 12 can be removed from the storage container 14.

The extraction member 12 can be any size and shape and a specific size and shape can be chosen by one skilled in the art for a particular purpose. In certain embodiments, the extraction member 12 can be cylindrically shaped. In one or more embodiments, the extraction member 12 has a length that is at least 2 times, 4 times, 6 times, or 8 times greater than the maximum external diameter of the extraction member 12. In various embodiments, the length of the extraction member 12 is at least 2 inches, 4 inches, 6 inches, 8 inches, or 10 inches, and/or not more than 40 inches, 30 inches, 20 inches, or 15 inches.

In the embodiment depicted in FIG. 1, the shiftable barrier 16 is positioned in the internal volume 14a of the storage container 14. In one or more embodiments, when the shiftable barrier 16 is positioned in the internal volume 14a of the storage container 14, the shiftable barrier 16 divides the internal volume 14a into a lower portion 14f and an upper portion 14g. The shiftable barrier 16 can be made from any rigid and/or flexible material and a suitable material can be chosen by one skilled in the art for a particular purpose. A non-limiting list of examples of suitable flexible or rigid materials includes rubber, silicone, plastic, and/or glass. In one or more embodiments, the shiftable barrier 16 has a specific gravity of less than 1.0, 0.9, 0.8, or 0.7.

In certain embodiments, the shiftable barrier 16 is configured to float upwardly and downwardly on the liquid in the internal volume 14a of the storage container 14 as the liquid enters and exits the internal volume 14a. In various embodiments, the shiftable barrier 16 is shiftable between a lowermost position and an uppermost position. In certain embodiments, when the shiftable barrier 16 is in the lowermost position, the lower surface of the shiftable barrier 16 is positioned to be in contact with the bottom 14d of the storage container 14, or the lower surface of the shiftable barrier 16 is positioned nor more than 0.1 inches, 0.01 inches, or 0.001 inches away from the bottom 14d of the storage container 14. In various embodiments, when the shiftable barrier 16 is in the uppermost position, the top surface of the shiftable barrier is positioned no more than 1 inch, 0.1 inches, 0.01 inches, or 0.001 inches, away from the top 14b of the storage container 14.

The shiftable barrier 16 can be any size and shape and a specific size and shape can be chosen by one skilled in the art for a particular purpose. In certain embodiments, the shiftable barrier 16 is generally cylindrically-shaped. In one or more embodiments, the horizontal cross-sectional shape of the shiftable barrier 16 is similarly shaped to the horizontal cross-sectional shape of the upright sidewall 14c of the storage container 14. In various embodiments, when the shiftable barrier 16 is upwardly shifting from the lowermost position to the uppermost position, the shiftable barrier 16 remains in contact with at least 92 percent, 94 percent, 96 percent, 98 percent, and/or 99 percent of the upper surface of the liquid in the storage container 14. In certain embodiments, when the shiftable barrier 16 is downwardly shifting from the uppermost position to the lowermost position, the shiftable barrier 16 remains in contact with at least 90 percent, 92 percent, 95 percent, and/or 99 percent of the upper surface of the liquid in the storage container 14. In one or more embodiments, the shiftable barrier 16 forms a liquid-tight seal with the sidewall 14c of the storage container 14.

In certain embodiments, the liquid handling system 10 can include one or more vents 17 configured to permit gas to flow through and/or around the shiftable barrier 16 from the lower portion 14f to the upper portion 14g of the internal volume 14a of the storage container 14. The vent 17 can be any venting mechanism capable of permitting the flow of gas from the lower portion 14f to the upper portion 14g, and a specific venting mechanism can be chosen by one skilled in the art for a particular purpose. In certain embodiments, the vent 17 is at least partially formed by a gap 17a between the shiftable barrier 16 and one or more sidewalls 14c of the storage container 14. For example, in the embodiment depicted in FIG. 1, the horizontal cross-sectional area of the shiftable barrier 16 is smaller than the horizontal cross-sectional area of the internal volume 14a of the storage container 14, which leaves a gap 17a that forms at least part of the vent 17. In certain other embodiments, the vent 17 can be at least partly formed by an opening extending through the shiftable barrier 16 and spaced inwardly from one or more sidewalls 14c, as discussed further with reference to FIG. 3. In certain other embodiments, where the shiftable barrier forms a liquid-tight seal with one or more sidewalls 14c, the vent 17 can be spaced inwardly from one or more sidewalls 14c. In one or more embodiments, a vent 17 can be formed by a gap 17a between the shiftable barrier 16 and one or more sidewalls 14c, and by an opening extending through the shiftable barrier 16 that is spaced inwardly from the sidewall 14c.

In one or more embodiments, the vent 17 is shiftable between an open configuration and a closed configuration. Any device and/or mechanism can be used to cause the vent 17 to shift between an open and a closed configuration, and a specific device and/or mechanism can be chosen by one skilled in the art for a particular purpose. In certain embodiments, the vent 17 can include a flap-like device that can open to release gas from the lower portion 14f into the upper portion 14g of the internal volume 14a of the storage container 14, and can close when there is no gas to release from the lower portion 14f of the internal volume 14a of the storage container 14.

In certain embodiments, the liquid handling system 10 can include a gas outlet 15 for releasing gas from the internal volume 14a of the storage container 14. In one or more embodiments, the storage container 14 includes a gas outlet 15 configured to release gas from the upper portion 14g of the internal volume 14a of the storage container 14 as the barrier 16 and/or the liquid being extracted shifts upwardly toward the uppermost position. The gas outlet 15 can be any device and/or mechanism that can release gas from the internal volume 14a of the storage container 14, such as, for example, a through opening or a one-way valve. A specific mechanism and/or device that can function as the gas outlet 15 can be chosen by one skilled in the art for a particular purpose. The gas outlet 15 can be coupled to any portion of the storage container 14 as long as the gas outlet 15 can release at least a portion of gas from the internal volume 14a of the storage container 14. For example, in the embodiment depicted in FIG. 1, the gas outlet 15 is coupled to the top 14b of the storage container 14.

The liquid handling system 10 can include a differential pressure creation device 18. In certain embodiments, the differential pressure creation device 18 can be any manual or automatic device that can at least partly cause liquid to flow from a container 11 into the internal volume 14a of the storage container 14. In certain embodiments, the differential pressure creation device 18 can be a compression pump, a vacuum pump, a siphon, or a plunger. In one or more embodiments, the differential pressure creation device 18 can be manually or automatically operated. In certain embodiments, the vacuum pump and/or the compression pump can include an automatic or manual plunger-type device.

The differential pressure creation device 18 can be coupled to the liquid handling system 10 in any manner and a specific coupling mechanism and/or device can be chosen by one skilled in the art for a particular purpose. In one or more embodiments, the differential pressure creation device 18 can be fixedly or removably coupled to the liquid handling system 10. In certain embodiments, when the liquid handling system 10 includes a vacuum pump 18a, the vacuum pump 18a can be in fluid flow communication with the storage container 14 and/or the extraction member 12 at a point above the liquid inlet 14e of the storage container 14. For example, in the embodiment depicted in FIG. 1, the liquid handling system 10 includes a vacuum pump 18a coupled to an opening 14h in the top 14b of the storage container 14 via a vacuum pump connector 18b. The vacuum pump connector 18b can be coupled to the opening 14h and the vacuum pump 18a in any manner known to one skilled in the art. In embodiments where the differential pressure creation device 18 is a manual plunger or a compression pump, such device can be coupled to the storage container 14 or to the container 11 in any manner known to one skilled in the art so as to cause liquid to flow into the interior volume 14a of the storage container 14.

In various embodiments, the liquid handling system 10 can include a shiftable air blocking device. The shiftable air blocking device can be any device that is able to block at least a portion of air from entering into the interior chamber 12a of the extraction member 12. In certain embodiments, the air blocking device can be located inside the extraction member 12. In one or more embodiments, the air blocking device can be a shiftable barrier received inside the interior chamber 12a of the extraction member 12 and can shift relative to the extraction member 12. In certain embodiments, the air blocking device can be any type of a manual or automatic plunger-type device. In one or more embodiments, the air blocking device can be operated manually and/or automatically.

In one or more embodiments, the liquid handling system 10 can be used to extract, store, and/or dispense a liquid. In certain embodiments, prior to filling the storage container 14 with a liquid from the container 11, the extraction member 12 can be inserted into the container 11, with the liquid inlet 12*d* of the extraction member 12 positioned below the surface of the liquid. In one or more embodiments, prior to filling the storage container 14, the liquid can be drawn up through the extraction member 12 coupled in fluid flow communication with the liquid inlet 14*e* of the storage container 14. In certain embodiments, the liquid can be drawn up through the extraction member 12 using a vacuum pump 18*a* connected to the storage container 14 at a point above the liquid inlet 14*e* of the storage container 14.

The storage container 14 can be filled by any filling mechanism known to one skilled in the art. In certain embodiments, filling the storage container 14 with a liquid can be at least partly caused by creating differential pressure between a liquid source contained in the container 11 and the internal volume 14*a* of the storage container 14. In such embodiments, the differential pressure can be created by a compression pump, a vacuum pump, a siphon, or a manual plunger. In certain embodiments, the differential pressure can be created using a compression pump to increase the pressure of the liquid source. In the embodiment depicted in FIG. 1, the storage container 14 can be filled, in part, by using the vacuum pump 18*a* to create a pressure differential between the liquid in the container 11 and the internal volume 14*a* of the storage container 14, thereby causing the liquid to flow from the container 11, through the interior chamber 12*a* of the extraction member 12, through the liquid inlet 14*e*, and into the internal volume 14*a* of the storage container 14.

In certain embodiments, while the storage container 14 is being filled with a liquid, a shiftable barrier 16 positioned in the storage container 14 is shifted from the lowermost position to an uppermost position. In one or more embodiments, the shifting of the shiftable barrier 16 is caused by the shiftable barrier 16 floating on the liquid. In various embodiments, the liquid inlet 14*e* of the storage container 14 is disposed below at least a portion of the shiftable barrier 16 when the shiftable barrier 16 is in the lowermost position. In one or more embodiments, while the storage container 14 is being filled with liquid, ambient air disposed below the shiftable barrier 16 flows upwardly around and/or through the shiftable barrier 16 via one or more vents 17. In various embodiments, while the shiftable barrier 16 is shifting from the lowermost position to an uppermost position, a gas can be released from inside the storage container 14 through a gas outlet 15. In certain embodiments, the gas being released through the gas outlet 15 can be air.

Once the storage container 14 has been filled with liquid, the liquid can be stored in the storage container 14 and/or the extraction member 12. In certain embodiments, the differential pressure creation device 18 can be removed and a seal or plug can be positioned to block air from entering through the opening 14*h* of the storage container 14. Further, in various embodiments, a seal device can be placed on the bottom end 12*c* of the extraction member 12 to seal the liquid inside the storage container 14 and/or the extraction member 12, and to minimize ambient air from contacting the liquid therein. Alternatively, in certain embodiments where the extraction member 12 is removable from the storage container 14, the extraction member 12 can be removed and a seal device can be placed to cover the liquid inlet 14*e* of the storage container 14 and seal the liquid inside the storage container 14, and to minimize ambient air from contacting the liquid therein.

In certain embodiments, a liquid can be dispensed from the storage container 14. In such embodiments, when at least a portion of the liquid in the storage container 14 is being dispensed, the shiftable barrier 16 can downwardly shift inside the storage container 14. For example, in such embodiments, the shiftable barrier 16 is shifted from an uppermost position towards or to a lowermost position as the liquid is dispensed from the storage container 14. In certain embodiments, when dispensing the liquid from the storage container 14 includes fully emptying the storage container 14 of the liquid, the shiftable barrier 16 can shift from the uppermost position to the lowermost position. In one or more embodiments, to dispense the liquid from the storage container 14, the liquid is passed through a liquid outlet 14*i* disposed below at least a portion of the shiftable barrier 16 when the shiftable barrier 16 is in the lowermost position. In various embodiments, the liquid outlet 14*i* and the liquid inlet 14*e* are formed by a common opening 14*j*. For example, in the embodiment depicted in FIG. 1, the common opening 14*j* of the storage container 14 is both the liquid inlet 14*e* and the liquid outlet 14*i*.

Figure 2:
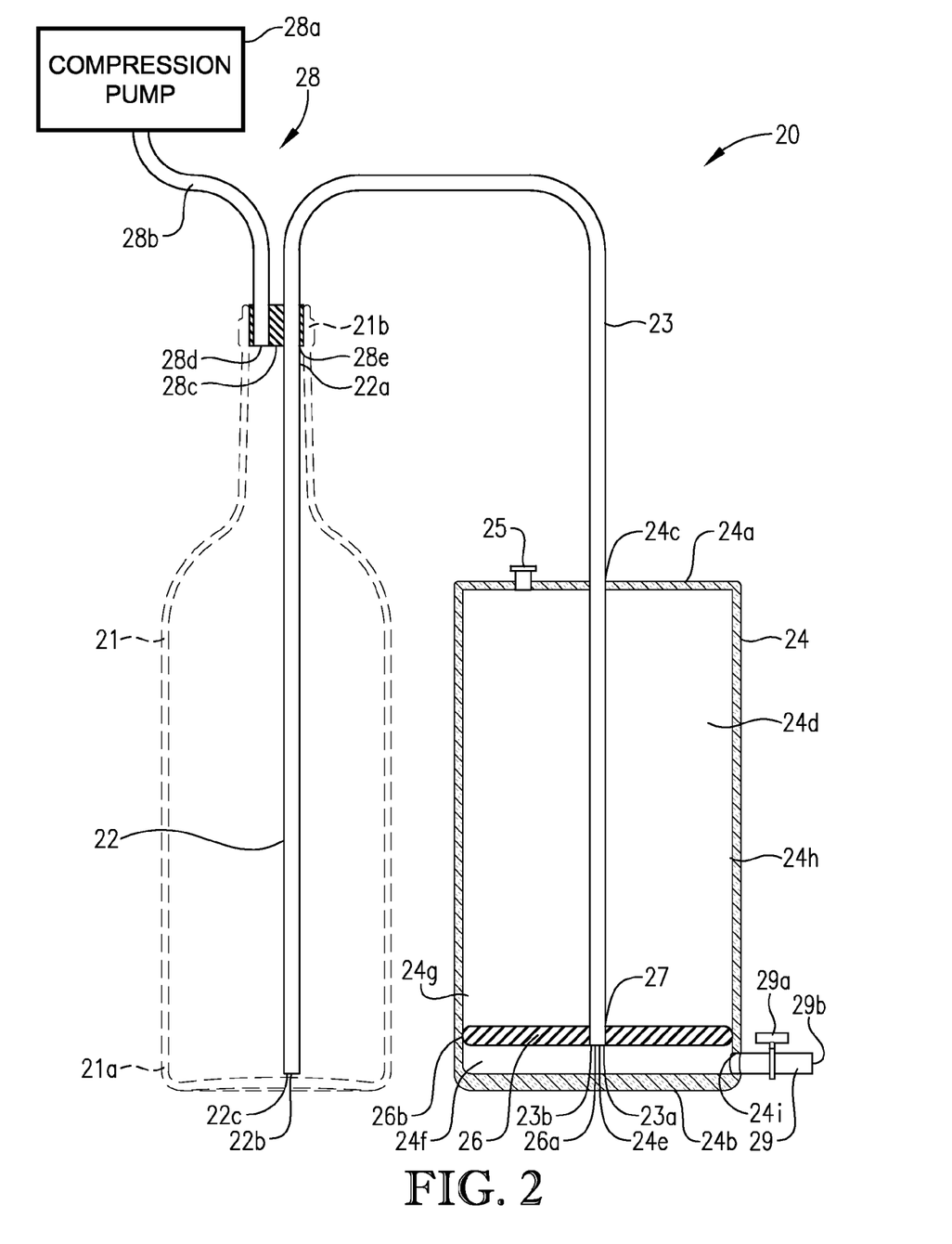
FIG. 2 is a cross-sectional and side view of a liquid handling system in accordance with another embodiment of the present invention, particularly illustrating an extraction member received inside a container and coupled to a seal device on the container, a liquid supply conduit partly received inside a storage container and coupled to the seal device, a shiftable barrier received inside the storage container and coupled to the liquid supply conduit, and an air pump coupled to the seal device.

FIG. 2 depicts another embodiment of a liquid handling system in accordance with the present invention. The liquid handling system 20 of FIG. 2 includes a differential pressure creation device 28, an extraction member 22, and a storage container 24 with a shiftable barrier 26 received therein. In certain embodiments, the differential pressure creation device 28 and the extraction member 22 can have the same properties and characteristics as the differential pressure creation device 18 and the extraction member 12 discussed above with reference to FIG. 1.

In certain embodiments, the differential pressure creation device 28 can be a compression pump 28*a*. In the embodiment depicted in FIG. 2, the compression pump 28*a* is coupled to a container 21 that can house a liquid. The compression pump 28*a* can be coupled to the container 21 in any manner known to one skilled in the art. In the embodiment depicted in FIG. 2, the differential pressure creation device 28 includes a seal device 28*c* at least partly received in the top portion 21*b* of the container 21 to enable the differential pressure creation device 28 to create a pressure differential within the container 21 sufficient to cause the liquid to flow through the extraction member 22, the liquid supply conduit 23, and into the storage container 24. In certain embodiments, the seal device 28*c* can be made of any flexible or rigid material that is capable of blocking the air from contacting the liquid inside the container 21, such as, for example, natural or synthetic cork, silicone, rubber and/or a rubber-like material. In the embodiment depicted in FIG. 2, the seal device 28*c* includes a through-opening 28*d* coupled to a compression pump tube 28*b*, and a separate through-opening 28*e* coupled to the top portion 22*a* of the extraction member 22.

The compression pump tube 28*b* and/or the extraction member 22 can be coupled to the through-openings 28*d* and/or 28*e* in any manner known to one skilled in the art. For example, in one or more embodiments, the compression pump tube 28*b* and/or the extraction member 22 can be coupled to the through-openings 28*d* and/or 28*e* by complimentary threaded portions in the seal device 28*c* and the compression pump tube 28*b* and/or the extraction member 22. In certain embodiments, the seal device 28*c* can include one through-opening 28*d* or 28*e* that is coupled to both the compression pump tube 28*b* and the extraction member 22. In one or more embodiments, the compression pump tube 28*b* and/or the top portion 22*a* of the extraction member 22 can be received inside the through-opening 28d and/or 28e and extend inside and/or outside of the container 21 beyond the seal device 28c. In certain other embodiments, a flexible material can be used to provide an air-tight seal around the portion of the compression pump tube 28b and/or the extraction member 22 received inside the through-openings 28d and/or 28e. In an embodiment not depicted in the figures, the compression pump tube 28b and/or the extraction member 22 can include a valve to control the flow of air and/or liquid into or out of the container 21.

In one or more embodiments, the differential pressure creation device 28 may be a siphon, vacuum pump, or plunger. In such embodiments, for example, where the differential pressure creation device 28 includes a siphon, one can connect the siphon to the container 21 and the storage container 24 in any manner known to one skilled in the art.

In the embodiment depicted in FIG. 2, the extraction inlet 22b of the extraction member 22 is positioned at or near the bottom end 21a of the container 21, with the extraction member 22 extending up into the seal device 28c. In one or more embodiments, the liquid handling system 20 can include an air blocking device coupled to the extraction member 22. The air blocking device can have the same properties and characteristics as those of the air blocking device discussed above with reference to the liquid handling system 10 of FIG. 1.

In certain embodiments, the liquid handling system 20 includes a liquid supply conduit 23, which is coupled in fluid flow communication with the extraction member 22 via the seal device 28c. In one or more embodiments, the liquid supply conduit 23 can be coupled to the seal device 28c in any manner discussed above with respect to the extraction member 22 coupling to the seal device 28c. In various embodiments, the liquid supply conduit 23 and the extraction member 22 can be directly coupled together. In certain embodiments, the extraction member 22 and the liquid supply conduit 23 are one integral article, where the portion inside the container 21 is the extraction member 22 and the portion exterior to the container 21 is the liquid supply conduit 23.

The liquid supply conduit 23 of FIG. 2 extends from the seal device 28c and through an opening 24c in the top 24a of the storage container 24. In one or more embodiments, a flexible material or other sealing device can be used to provide a liquid and/or airtight seal around the liquid supply conduit 23 received in the opening 24c of the storage container 24.

In one or more embodiments, the liquid supply conduit 23 is coupled to the shiftable barrier 26 at the opening 26a of the shiftable barrier 26. For example, in the embodiment depicted in FIG. 2, the terminal end 23a of the liquid supply conduit 23 is coupled to the shiftable barrier 26 at the opening 26a. Further, in the embodiment depicted in FIG. 2, the terminal end 23a of the liquid supply conduit 23 is in fluid flow communication with the opening 26a of the shiftable barrier 26 so as to provide access to the lower portion 24f of the internal volume 24d of the storage container 24. In certain embodiments, the liquid supply conduit 23 extends into the internal volume 24d of the storage container 24 and through an opening 26a in the shiftable barrier 26, where the liquid supply conduit 23 defines the liquid inlet 24e of the storage container 24. The liquid inlet 24e of the storage container 24 of FIG. 2 is configured to allow a liquid to flow from the liquid supply conduit 23, and into the lower portion 24f of the interior volume 24d of the storage container 24. In certain embodiments, the shiftable barrier 26 is configured to shift relative to the liquid supply conduit 23.

In embodiments where the liquid supply conduit 23 is coupled to the shiftable barrier 26, the liquid supply conduit 23 can be coupled to the shiftable barrier 26 in any manner as long as the liquid can flow from the liquid supply conduit 23 and into the internal volume 24d of the storage container 24, such as, for example, by complimentary threaded portions on the shiftable barrier 26 and the terminal end 23a of the liquid supply conduit 23.

In certain embodiments, the shiftable barrier 26 can have the same properties and parameters as the shiftable barrier 16 discussed above with respect to FIG. 1. For example, the shiftable barrier 26 can have the same size, shape, and compositional characteristics as the shiftable barrier 16 discussed above with reference to FIG. 1. In another example, the shiftable barrier 26 can have the same properties and characteristics to form the various embodiments of the vents 17 discussed above with reference to the liquid handling system 10 of FIG. 1. In certain embodiments, the liquid handling system 20 can include a vent 27 that is defined by the opening 26a of the shiftable barrier 26, even as the shiftable barrier 26 is coupled to the liquid supply conduit 23 at the opening 26a. For example, the cross sectional area of the liquid supply conduit 23 can be smaller than the cross-sectional area of the opening 26a so as to provide a gap between the liquid supply conduit 23 and the portion of the shiftable barrier 26 defining the opening 26a thereby forming a vent 27. In one or more embodiments, the shiftable barrier 26 can have an opening in addition to the opening 26a that can function as a vent 27. In certain other embodiments, the liquid handling system 20 can have a vent 27 that is formed by a gap between a sidewall 24h of the storage container 24 and the outer edge 26b of the shiftable barrier 26. In one or more embodiments, the liquid handling system 20 can have more than one vent 27.

In certain embodiments, the storage container 24 can have the same properties and parameters as the storage container 14 that were discussed above with respect to FIG. 1. In one or more embodiments, the storage container 24 includes a liquid outlet 24i positioned near the bottom 24b of the storage container 24. In certain embodiments, the storage container 24 includes a liquid outlet 24i disposed below at least a portion of the shiftable barrier 26 when the shiftable barrier 26 is in the lowermost position. The liquid outlet 24i can be positioned at any location on the storage container 24. In certain embodiments, the liquid outlet 24i is positioned in a sidewall 24h, and is no more than 2 inches, 1 inch, 0.5 inches, or 0.1 inches away from the upper surface of the bottom 24b of the storage container 24. In one or more embodiments, the liquid outlet 24i can be cooperatively positioned within both a sidewall 24h and the bottom 24b of the storage container 24. In certain other embodiments, the liquid outlet 24i can be positioned within the bottom 24b of the storage container 24.

In the embodiment depicted in FIG. 2, the liquid handling system 20 includes a spigot 29 that is coupled in fluid communication with the liquid outlet 24i and configured to dispense liquid from the storage container 24. The spigot 29 can be any type of spigot 29 known by one skilled in the art, as long as the spigot is capable of dispensing a liquid from the storage container 24. The spigot 29 can be coupled in fluid communication with the liquid outlet 24i in any manner known to one skilled in the art. For example, in certain embodiments, the spigot 29 can be coupled to the liquid outlet 24i by complimentary threaded portions on the spigot 29 and the storage container 24. In certain other embodiments, the spigot 29 can be coupled to the liquid outlet 24i via glue or welding.

The spigot 29 of FIG. 2 includes a valve 29a that can be shifted between a liquid filling configuration and a liquid dispensing configuration. In the liquid filling configuration, the valve 29a is configured to block the liquid from exiting through the spigot outlet 29b, and to block air from flowing through the spigot outlet 29b and into the storage container 24. In the liquid dispensing configuration, the valve 29a is configured to allow the liquid to flow from the internal volume 24d of the storage container 24 and out through the spigot outlet 29b. The valve 29a can be any type of valve as long as it is capable of shifting between a filling configuration and a liquid dispensing configuration, and a specific valve can be chosen by one skilled in the art for a particular purpose.

The liquid handling system 20 of FIG. 2 includes a gas outlet 25. The gas outlet 25 of FIG. 2 is coupled to the top 24a of the storage container 24 and is configured to release a gas from the upper portion 24g of the internal volume 24d of the storage container 24. The gas outlet 25 can have the same properties and characteristics as the gas outlet 15 discussed above with reference to FIG. 1.

In certain embodiments, the liquid handling system 20 can be used to fill the storage container 24 with a liquid housed in the container 21. In one or more embodiments, the compression pump 28a, or other differential pressure creation device, can cause the liquid to flow from the container 21 into the storage container 24 by creating a pressure differential between a liquid source, e.g., the liquid housed in the container 21, and the internal volume 24d of the storage container 24. In various embodiments, filling the storage container 24 with a liquid can include passing the liquid through the liquid supply conduit 23 that extends through the opening 26a in the shiftable barrier 26, where the liquid supply conduit 23 defines the liquid inlet 24e through which the storage container 24 is filled. In the embodiment depicted in FIG. 2, the compression pump 28a can cause the liquid in the container 21 to flow into the extraction inlet 22b of the extraction member 22, through the interior chamber 22c of the extraction member 22, through the interior chamber 23b of the liquid supply conduit 23, out of the liquid inlet 24e, and into the lower portion 24f of the internal volume 24d of the storage container 24.

In one or more embodiments, as the storage container 24 is filling with a liquid, the shiftable barrier 26 shifts from a lowermost position to or towards an uppermost position, as discussed above with reference to the liquid handling system 10 of FIG. 1. In certain embodiments, as the storage container 24 is filling with the liquid, the shiftable barrier 26 shifts relative to the liquid supply conduit 23. In certain other embodiments, when the storage container 24 is filling with a liquid, and the liquid supply conduit 23 is coupled to the shiftable barrier 26 at the opening 26a, at least a portion of the liquid supply conduit 23 can shift along with the shiftable barrier 26 as the shiftable barrier 26 shifts upward. In one or more embodiments, when the storage container 24 is filling with a liquid, or at any other time, a gas can flow from the lower portion 24f of the internal volume 24d of the storage container 24, through the vent 27, through the upper portion 24g of the internal volume 24d, and out through the gas outlet 25.

In certain embodiments, the liquid handling system 20 can dispense a liquid from the internal volume 24d of the storage container 24. In one or more embodiments, the characteristics described above with respect to dispensing liquid from the storage container 14 of FIG. 1 apply to the liquid handling system of FIG. 2. In certain embodiments, dispensing a liquid from the internal volume 24d of the storage container 24 can include passing the liquid through the spigot 29 coupled in fluid communication with the liquid outlet 24i. In various embodiments, when the liquid is dispensed from the internal volume 24d of the storage container 24, the valve 29a of the spigot 29 is shifted from a liquid filling configuration to a liquid dispensing configuration.

Figure 3:
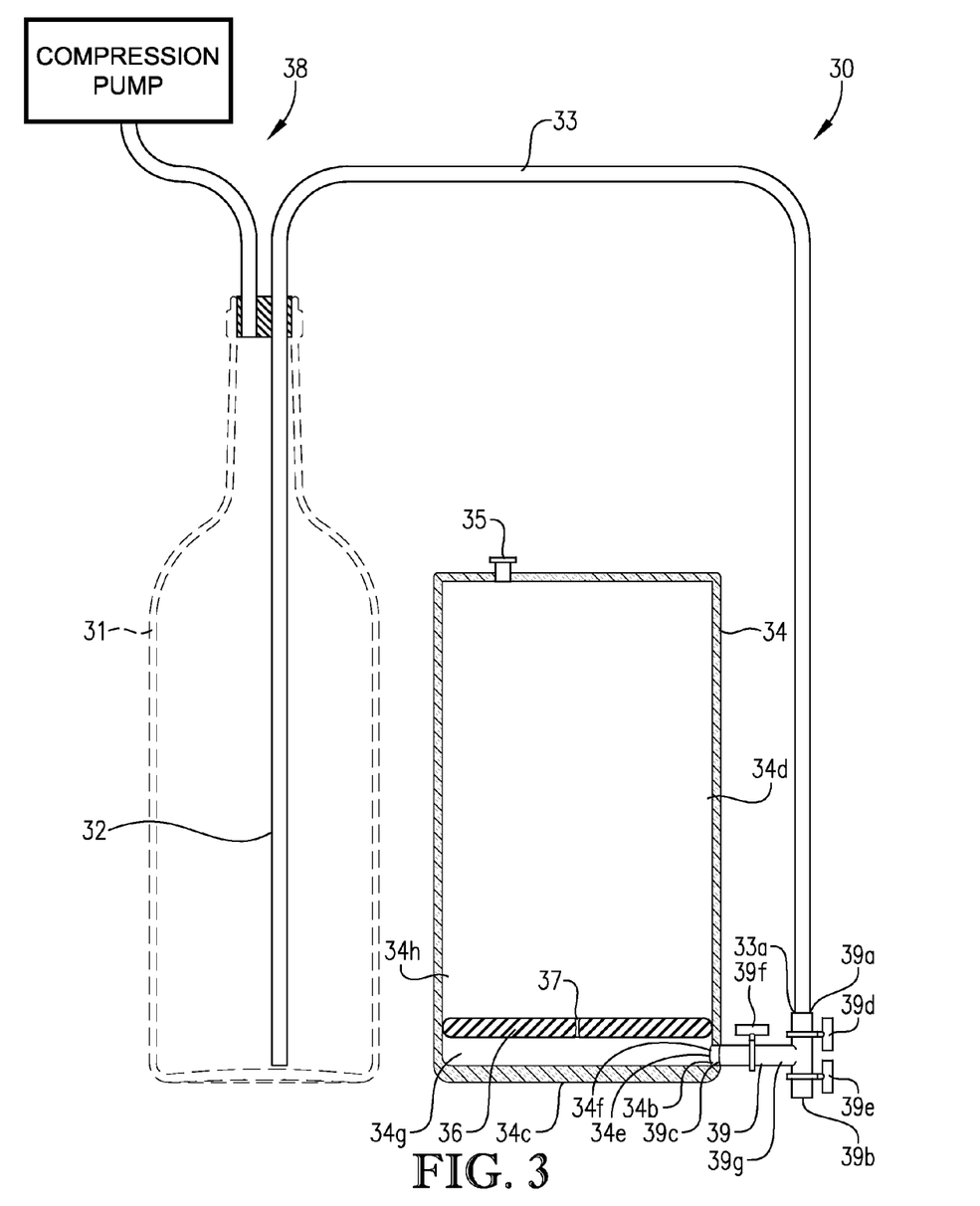
FIG. 3 is a cross-sectional and side view of a liquid handling system in accordance with another embodiment of the present invention, particularly illustrating an extraction member received inside a container and coupled to a seal device on the container, a liquid supply conduit coupled to the seal device, a shiftable barrier received inside a storage container, a spigot coupled to the storage container and to the liquid supply conduit, and a compression pump coupled to the seal device.

FIG. 3 depicts a liquid handling system 30 in accordance with another embodiment of the present invention. The liquid handling system 30 includes a differential pressure creation device 38, an extraction member 32, a liquid supply conduit 33, and a storage container 34 with a shiftable barrier 36 received therein. In certain embodiments, the aforementioned components of the liquid handling system 30 can have the same properties and characteristics as the respective components of the liquid handling system 20 discussed above with reference to FIG. 2. In one or more embodiments discussed below, the storage vessel 34 and the liquid supply conduit 33 can include additional or different characteristics. For example, in certain embodiments, the liquid inlet 34b of the storage container 34 is not formed in part by a connection between the liquid supply conduit 33 and an opening in the shiftable barrier 36.

In the embodiment depicted in FIG. 3, the liquid inlet 34b of the storage container 34 is positioned below the shiftable barrier 36 when the shiftable barrier 36 is in the lowermost position. For example, in certain embodiments, the liquid inlet 34b can be positioned near the bottom 34c of the storage container 34. In one or more embodiments, the liquid inlet 34b is positioned no more than 2 inches, 1 inch, 0.5 inches, or 0.1 inches from the upper surface of the bottom 34c of the storage container 34. The liquid inlet 34b can be positioned at any other location on the storage container 34. For example, in certain other embodiments, the liquid inlet 34b can be cooperatively defined by both a sidewall 34d and the bottom 34c of the storage container 34. Further, in one or more embodiments, the liquid inlet 34b can be positioned within or at the bottom 34c of the storage container 34.

In certain embodiments, the storage container 34 of FIG. 3 includes a liquid outlet 34e. In one or more embodiments, the liquid outlet 34e can be positioned on the storage container 34 and have the same parameters as discussed above with respect to the positioning of the liquid inlet 34b of the storage container 34. In certain embodiments, the liquid outlet 34e and the liquid inlet 34b are formed by a common opening 34f. The common opening 34f can be positioned anywhere on the container 34 and can have the same parameters as discussed above with respect to the positioning of the liquid inlet 34b of the storage container 34.

The liquid handling system 30 of FIG. 3 includes one or more spigots 39. The spigot 39 can be positioned at any location on the storage container 34 and/or the liquid supply conduit 33. In the embodiment depicted in FIG. 3, the spigot 39 is coupled in fluid communication with the common opening 34f of the storage container 34. The spigot 39 can be coupled to the storage container 34 and/or the liquid supply conduit 33 in any manner. For example, in certain embodiments, the spigot 39 can be coupled to the common opening 34f of the storage container 34 by complimentary threaded portions on the spigot end 39c and on the storage container 34. In certain other embodiments, the spigot 39 can be coupled to the common opening 34f by glue or welding.

The spigot 39 can be any type of spigot and a particular spigot can be chosen by one skilled in the art for a specific purpose. In certain embodiments, the spigot 39 can include a spigot inlet 39a for receiving the liquid, a spigot outlet 39b for discharging the liquid, and one or more spigot valves, e.g., 39d, 39e, and/or 39f, selectively providing fluid communication between the common opening 34f of the storage container 34 and either the spigot inlet 39a or the spigot outlet 39b. Any type of valve can be used to control the flow of liquid through the spigot 39 and a particular type of valve or configuration of valves can be chosen by one skilled in the art for a specific purpose.

In the embodiment depicted in FIG. 3, the spigot inlet 39a is coupled to the terminal end 33a of the liquid supply conduit 33. The spigot inlet 39a can be coupled to the liquid supply conduit 33 in any manner known to one skilled in the art, as long as at least a portion of liquid can flow from the liquid supply conduit 33 and into the spigot inlet 39a. For example, in certain embodiments, the terminal end 33a of the liquid supply conduit 33 can be sized to slide into at least a portion of the spigot inlet 39a. In certain other embodiments, the terminal end 33a of the liquid supply conduit 33 can be coupled to the spigot inlet 39a by complementary threaded portions.

In certain embodiments, any number of spigot valves can be used and positioned at any location on the spigot 39 to shift the spigot 39 into any or all of the following configurations: the storage container filling configuration, the storage container dispensing configuration, the liquid container dispensing configuration, and the storage configuration. In such embodiments where the spigot 39 is shifted into a storage container filling configuration, spigot valves 39d and 39f would be positioned to allow liquid to flow from the liquid supply conduit 33, through the spigot inlet 39a, through the hollow housing 39g, through the common opening 34f, and into the storage container 34, while spigot valve 39e would be positioned to block liquid from flowing from the hollow housing 39g and out through the spigot outlet 39b. In such embodiments where the spigot 39 is shifted into the storage container dispensing configuration, spigot valves 39e and 39f would be positioned so that liquid can flow from the storage container 34, through the common opening 34f, through the hollow housing 39g, through the spigot outlet 39b, and into a vessel, while spigot valve 39d would be positioned to block liquid flowing from the hollow housing 39g and into the liquid supply conduit 33. In such embodiments where the spigot 39 is shifted into a liquid container dispensing configuration, spigot valves 39d and 39e would be positioned to allow liquid to flow from the container 31, through the liquid supply conduit 33, through the spigot inlet 39a, through the hollow housing 39g, through the spigot outlet 39b, and into a vessel, while spigot valve 39f would be positioned to block liquid from flowing from the hollow housing 39g and into the storage container 34. In such embodiments where the spigot 39 is shifted into a storage configuration, spigot valve 39f would be positioned to block liquid from flowing from the storage container 34 into the hollow housing 39g.

In certain embodiments, one or more spigot valves may be positioned at various locations on the spigot 39 or on the liquid supply conduit 33 to shift between any or all of the aforementioned spigot configurations. For example, in certain embodiments, one spigot valve can be positioned inside the hollow housing 39g that can shift between at least three of the aforementioned spigot configurations, while another spigot valve can be positioned at the spigot outlet 39b to control dispensing of the liquid.

In certain embodiments, one can extract a liquid from the container 31 into the extraction member 32 in the manner discussed above with reference to the liquid handling system 20 of FIG. 2. In such embodiments, the liquid can flow from the extraction member 32, through the liquid supply conduit 33, through the spigot inlet 39a for either storage and/or dispensing, as discussed above with reference to the storage container filling configuration, the storage container dispensing configuration, the liquid container dispensing configuration, and the storage configuration. In certain embodiments, when the storage container 34 is being filled the liquid, the shiftable barrier 36 can be shifted from a lowermost position up to or towards the uppermost position. In one or more embodiments, when the storage container 34 is being filled with a liquid or at any other time, a gas can flow from the lower portion 34g of the internal volume 34a of the storage container 34, through the vent 37 (which may optionally be closable) positioned in the shiftable barrier 36, through the upper portion 34h of the internal volume 34a, and out through the gas outlet 35. In certain embodiments, when liquid is being dispensed from the storage container 34, the shiftable barrier 36 can be shifted from an uppermost position to or towards a lowermost position.

Figure 4:
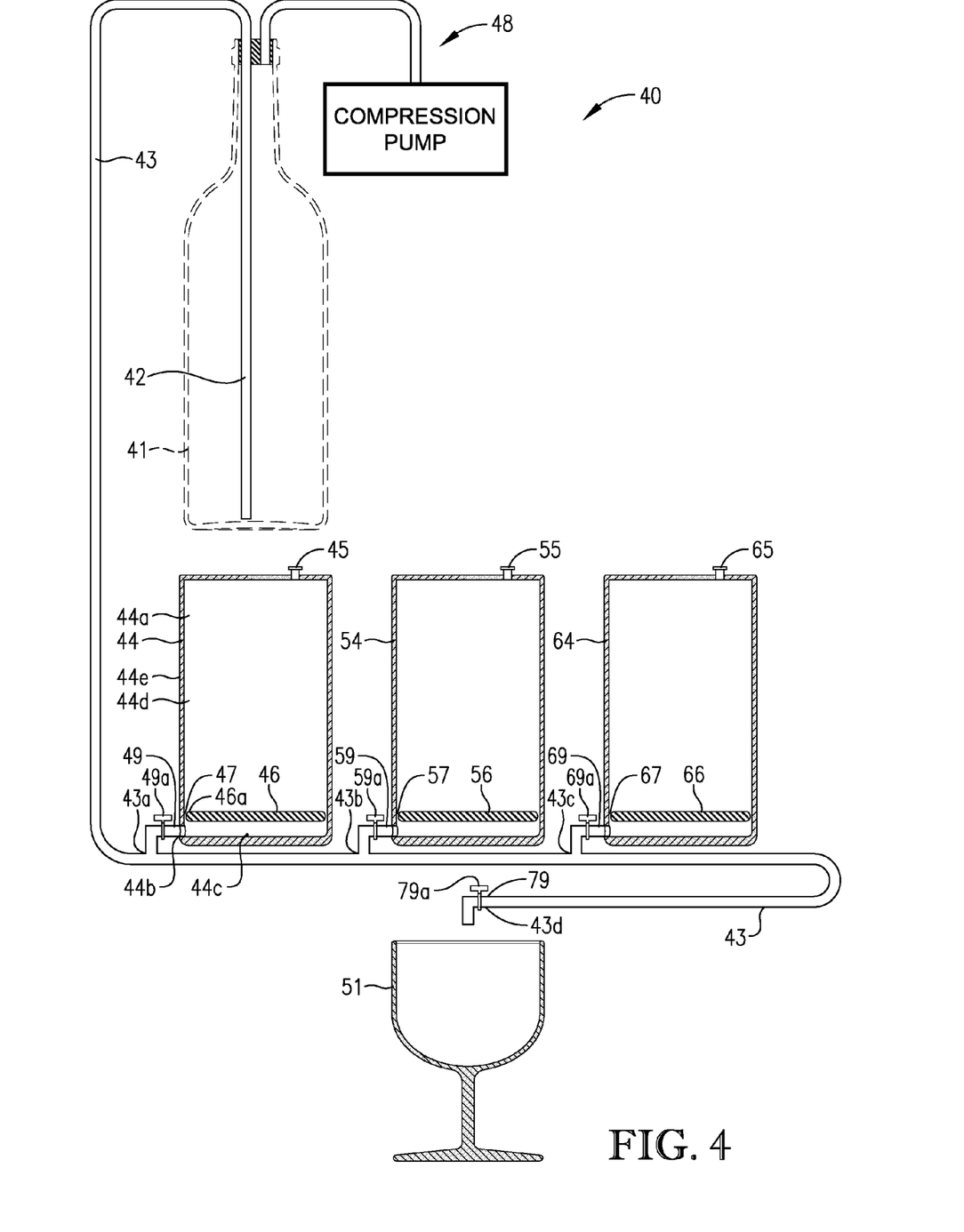
FIG. 4 is a cross-sectional and side view of a liquid handling system in accordance with yet another embodiment of the present invention, particularly illustrating an extraction member received inside a container and coupled to a seal device on the container, a liquid supply conduit coupled to the seal device, a shiftable barrier received inside a storage container, a spigot coupled to the storage container and to the liquid supply conduit, a compression pump coupled to the seal device, and two storage vessels coupled to the supply conduit, with each storage vessel having a shiftable barrier received therein.

FIG. 4 depicts another embodiment of a liquid handling system 40 in accordance with the present invention. The liquid handling system 40 includes a differential pressure creation device 48, an extraction member 42, a liquid supply conduit 43, and a storage container 44 having a shiftable barrier 46 received therein. In one or more embodiments, the aforementioned components of the liquid handling system 40 can have the same properties and parameters as those discussed above with reference to the liquid handling system 30 of FIG. 3. In certain embodiments, the liquid handling system 40 can fill the storage container 44 with a liquid from a container 41 in the same manner as discussed above with respect to the liquid handling system 30 of FIG. 3.

In the embodiment depicted in FIG. 4, the liquid handling system 40 can extract a liquid from the container 41, up into the extraction member 42, through the liquid supply conduit 43, through the liquid supply conduit branch 43a, through the spigot 49, through the common opening 44b in the storage container 44, and into lower portion 44c of the internal volume 44a of the storage container 44. In certain embodiments, the liquid supply conduit branch 43a is a branched extension of the liquid supply conduit 43 that is coupled in fluid flow communication with the spigot 49.

The liquid supply branch 43a can be coupled to the spigot 49 in any manner known to one skilled in art as long as the liquid supply conduit 43 is in fluid flow communication with the common opening 44b of the storage container 44. In certain embodiments, the liquid supply conduit branch 43a can be coupled to the spigot 49 in any manner discussed above with reference to the connection between the liquid supply conduit 33 and the spigot 39 of the liquid handling system 30 of FIG. 3. In one or more embodiments, the spigot 49 can be any type of spigot known to one skilled in the art. In certain embodiments, the spigot 49 can be a conduit connecting the liquid supply conduit branch 43a to the storage container 44.

In the embodiment depicted in FIG. 4, the spigot 49 is coupled to the common opening 44b of the storage container 44 and to the liquid supply conduit branch 43a. The spigot 49 can be coupled to the storage container 44 in any manner as discussed above regarding the respective components of the liquid handling system 30 of FIG. 3. In certain embodiments, the spigot 49 can include a spigot valve 49a to control the flow of a liquid through the spigot 49. In one or more embodiments, the spigot valve 49a can have the same properties and parameters of the spigot valves 39d, 39e, and/or 39f of the liquid handling system 30 of FIG. 3.

In certain embodiments, when the liquid flows from the liquid supply conduit branch 43a and into the lower portion 44c of the interior volume 44a of the storage container 44, the shiftable barrier 46 shifts upward from a lowermost position towards, to, or near, an uppermost position. In such embodiments, a gas can flow from the lower portion 44c of the interior volume 44a to the upper portion 44d of the interior volume, via a vent 47, and through a gas outlet 45, as discussed above with reference to the liquid handling system 30 of FIG. 3. In the embodiment depicted in FIG. 4, the vent 47 is formed by a gap 46*a* between the shiftable barrier 46 and one or more sidewalls 44*e* of the storage container 44. In certain embodiments, the liquid handling system 40 can have any number of vents 47 formed in any manner discussed above with reference to the liquid handling systems 10, 20, and 30 of FIGS. 1, 2, and 3, respectively.

In certain embodiments, the liquid handling system 40 can include one or more additional storage vessels coupled in fluid flow communication with the storage container 44. In such embodiments, a shiftable barrier can be received in each of the additional storage vessels. For example, in the embodiment depicted in FIG. 4, the liquid handling system 40 includes two storage vessels 54 and 64, having shiftable barriers 56 and 66, respectively, received therein. In certain embodiments, the liquid handling system 40 can have any number of storage vessels, such as, for example, at least one, two, three or four storage vessels.

In one or more embodiments, the storage vessels 54 and 64, and the shiftable barriers 56 and 66, can have the same properties and parameters as discussed above with respect to the storage container 44 and shiftable barrier 46. In certain other embodiments, the storage vessels 54 and 64, and the shiftable barriers 56 and 66, can be identical to one another or exhibit distinct features from one another. In various embodiments, the storage vessels 54 and 64 can include vents 57 and 67, and gas outlets 55 and 65, respectively, having the same parameters and variations as discussed above with respect to the vent 47 and gas outlet 45.

In one or more embodiments, the liquid handling system 40 can include a liquid supply conduit 43 coupled in fluid flow communication with the storage container 44 and the storage vessels 54 and 64. In certain embodiments, the liquid supply conduit 43 is configured to discharge fluid from the storage container 44 and/or the storage vessels 54 and 64. For example, in the embodiment depicted in FIG. 4, the spigots 49, 59, and 69 are coupled to the liquid supply conduit 43, via liquid supply branches 43*a*, 43*b*, and 43*c*, respectively, with the liquid supply conduit 43 having a terminal end 43*d* downstream of the storage container 44 and the storage vessels 54 and 64 that can be used to discharge liquid into a vessel 51.

The liquid supply conduit branches 43*b* and 43*c* can be coupled to the spigots 59 and 69, respectively, in the any manner discussed above with respect to the liquid supply conduit branch 43*a* and the spigot 49. The spigots 59 and 60 can be coupled to the storage vessels 54 and 64, respectively, in any manner discussed above with respect to the spigot 49 and the storage container 44. In various embodiments, the spigots 59 and 69 can include spigot valves 59*a* and 69*a*, respectively, which can function in the same manner as any of the above-described spigot valves.

In certain embodiments, the liquid handling system 40 can fill the storage container 44 and one or more additional storage vessels, e.g., storage vessels 54 and/or 64, with at least a portion of the liquid from the container 41. In such embodiments, the storage container 44, and the storage vessels 54 and 64, can be filled simultaneously, or spigot valves 59*a* and 69*a* can selectively block liquid from flowing into either one or both of the storage vessels 54 and 64.

In certain embodiments, the spigot valves, e.g., 49*a*, can be shifted between an open configuration, where the spigot valve 49*a* can permit a liquid to flow from the liquid supply conduit 43 and into the storage container 44, and a storage configuration, where the spigot valve 49*a* can block the liquid flowing from the storage container 44 and out into the liquid supply conduit 43. In one or more embodiments, the spigot valves 59*a* and 69*a* can function in the same manner as described with reference to the spigot valve 49*a*. Further, in one or more embodiments, when the spigot valves 49*a*, 59*a*, and/or 69*a* are shifted into the open configuration, the liquid can flow through the liquid supply conduit 43, through the spigot 79, and into a vessel 51. In certain embodiments, the spigot 79 can include a spigot valve 79*a* for selectively blocking or permitting the flow of liquid from the liquid supply conduit 43 into the vessel 51. In one or more embodiments, additional valves can be placed at any location on the liquid handling system 40 to selective permit or block the flow of liquid to any one or more portions of the liquid handling system 40.

In certain other embodiments, the liquid handling system 40 does not include spigots 49, 59, and/or 69. In such embodiments, for example, where the liquid handling system 40 does not include a spigot 49, the liquid supply conduit branch 43*a* can be directly or indirectly coupled to the storage container 44. Further, in such embodiments, a valve 49*a* can be coupled to the liquid supply conduit branch 43*a* to block and/or permit liquid to flow into and out of the storage container 44. Alternatively, in certain embodiments, the liquid handling system 40 can include the spigot 39 of FIG. 3 in place of any or all of the spigots 49, 59, 69, and 79. In such embodiments, where the spigot 39 is present in the liquid handling system 40, the liquid supply conduit 43 can be coupled to a spigot inlet, and at least one additional discharge conduit can be coupled to a spigot outlet that can be configured to permit liquid to flow out into a vessel 51.

In certain embodiments, the process of handling a liquid using any of the liquid handling systems of the present invention, e.g., liquid handling systems 10, 20, 30, and/or 40, may be manually and/or automatically controlled. For example, in certain embodiments where a liquid handling system of the present invention is automatically controlled, at least one machine and/or at least one actuator can control any component of that liquid handling system. For example, in one or more embodiments, where the liquid handling system 40 is automatically controlled, the differential pressure creation device 48 and/or any or all of the spigot valves 49*a*, 59*a*, 69*a*, and 79*a* (as well as the spigots and/or spigot valves depicted in FIGS. 2 and 3) may be automatically controlled by an actuator and/or other machine. In certain embodiments, where the liquid handling system 40 is automatically controlled, a controller device may be coupled to the liquid handling system 40 that is configured to allow a user to control any machine and/or actuator coupled to the liquid handling system 40.

In one or more embodiments, any of the liquid handling systems of the present invention, e.g., liquid handling systems 10, 20, 30, and/or 40, may include a housing structure to conceal all or a portion of the system when in use or not in use. In such embodiments, for example, the entire system may be received inside said housing structure to store the system when not in use. In one or more embodiments that include a housing structure, the housing structure may include shelves, hanging devices, and/or stands to hold at least one or more components of any of the liquid handling systems contemplated by this invention.

It is the inventor's intent to rely on the Doctrine of Equivalents to determine and assess the reasonably fair scope of the present invention as it pertains to any processes and systems not materially departing from but outside the literal scope of the invention as set forth in the following claims.

What is claimed is:

1. A system for receiving, storing, and dispensing a liquid with minimal exposure of said liquid to ambient air, said system comprising:
a storage container comprising a top, a bottom, and one or more upright sidewalls, wherein said top, bottom, and sidewalls cooperatively define an internal volume configured to receive and hold said liquid;
a shiftable barrier positioned in said internal volume and dividing said internal volume into a lower portion and an upper portion, wherein said barrier is shiftable between a lowermost position and an uppermost position, wherein said barrier is sized to fill at least 90 percent of the horizontal cross-sectional area of said internal volume defined by said upright sidewalls;
a liquid inlet disposed below at least a portion of said barrier when said barrier is in said lowermost position;
an elongated liquid extraction member coupled in fluid flow communication with said liquid inlet of said storage container, wherein said liquid extraction member extends from said liquid inlet and includes a free end that is configured to be received within a wine bottle;
at least one differential pressure creation device coupled in fluid flow communication with the wine bottle, for causing said liquid to flow from the wine bottle, through said liquid extraction member, and into said internal volume of said storage container; and
at least one vent configured to permit gas to flow through and/or around said barrier from said lower portion of said internal volume to said upper portion of said internal volume.

2. The system according to claim 1, wherein said shiftable barrier is configured to float upwardly on said liquid in said internal volume as said liquid enters said internal volume.

3. The system according to claim 1, wherein said liquid extraction member has a length that is at least 2 times greater than the maximum diameter of said liquid extraction member, wherein said length is at least 4 inches and/or not more than 40 inches.

4. The system according to claim 1, wherein the maximum internal diameter of said liquid storage container is at least 1.5 times greater than the maximum internal diameter of said liquid extraction member.

5. The system according to claim 1, wherein said vent is at least partially formed by an opening extending through said barrier and spaced inwardly from said one or more sidewalls.

6. The system according to claim 1, wherein said top is detachable from said sidewalls.

7. The system according to claim 1, wherein said vent is at least partially formed by a gap between said barrier and said one or more sidewalls.

8. The system according to claim 1, wherein said container comprises a gas outlet configured to release gas from said upper portion of said internal volume as said barrier shifts upwardly toward said upper position.

9. The system according to claim 1, wherein said differential pressure device comprises a compression pump, a vacuum pump, a siphon, or a plunger.

10. The system according to claim 1, wherein said storage container comprises a liquid outlet disposed below at least a portion of said barrier when said barrier is in said lowermost position, wherein said liquid inlet and said liquid outlet are formed by a common opening.

11. The system according to claim 10, further comprising a spigot coupled in fluid communication with said liquid outlet and configured to dispense liquid from said container.

12. The system according to claim 1, wherein said liquid is wine.

13. The system according to claim 12, wherein said liquid extraction member has a length that is at least 2 times greater than the maximum external diameter of said liquid extraction member, wherein said length is at least 4 inches and not more than 40 inches.

14. The system according to claim 12, wherein said container comprises a liquid outlet disposed below at least a portion of said barrier when said barrier is in said lowermost position, wherein said liquid inlet and said liquid outlet are formed by a common opening.

15. The system according to claim 12, wherein said shiftable barrier is configured to float upwardly on said liquid in said internal volume as said liquid enters said internal volume.

16. The system according to claim 12, wherein said system further comprises one or more additional storage vessels coupled in fluid flow communication with said storage container, and wherein said system further comprises an additional shiftable barrier received in each of said storage vessels.

* * * * *